(12) United States Patent
Rees, Jr.

(10) Patent No.: US 6,302,947 B1
(45) Date of Patent: Oct. 16, 2001

(54) APPARATUS FOR CONTROLLING AIR-BORNE PARTICLES AT A MANICURE WORK STATION

(76) Inventor: Warren A. Rees, Jr., 218 Poenisch Dr., Corpus Christi, TX (US) 78412

( * ) Notice: Subject to any disclaimer, the term of this patent is extended or adjusted under 35 U.S.C. 154(b) by 0 days.

(21) Appl. No.: 09/574,528

(22) Filed: May 19, 2000

(51) Int. Cl.[7] .................................................. B01D 47/02
(52) U.S. Cl. ........................... 96/329; 96/351; 55/385.2; 55/462; 55/473; 55/DIG. 18
(58) Field of Search .............. 96/243, 329, 331, 96/332, 351; 55/385.2, 385.4, 462, 467, 473, DIG. 18, DIG. 29; 95/149, 151, 216, 230, 237, 267; 454/49, 56, 57, 67; 312/209; 261/119.1, 123

(56) References Cited

U.S. PATENT DOCUMENTS

| | | |
|---|---|---|
| D. 285,962 | 9/1986 | Yoho . |
| 1,365,278 * | 1/1921 | Ruth, Jr. ................................. 95/151 |
| 2,787,454 * | 4/1957 | Coppola ................................. 96/351 |
| 4,172,865 * | 10/1979 | Steier ..................................... 96/331 |
| 4,647,295 * | 3/1987 | Christ .............................. 55/DIG. 18 |
| 4,852,468 | 8/1989 | Harris . |
| 5,083,558 * | 1/1992 | Thomas et al. ................. 55/DIG. 18 |
| 5,112,373 | 5/1992 | Pham . |
| 5,395,166 | 3/1995 | Watson . |
| 5,464,029 * | 11/1995 | Rentz ..................................... 454/56 |
| 5,787,903 | 8/1998 | Blackshear . |
| 5,816,906 | 10/1998 | Mai . |

* cited by examiner

*Primary Examiner*—Duane Smith
*Assistant Examiner*—Jason M. Greene

(57) ABSTRACT

A apparatus for controlling air-borne particles at a manicure work station for controlling fumes and air-borne particles associated with manicures. The apparatus for controlling air-borne particles at a manicure work station includes a platform. The platform has a top surface. The platform has a lumen therein. The platform has a plurality of apertures extending into the lumen from the top surface. A housing has a top wall, a front wall, a back wall, a first side wall and a second side wall. The housing is integrally coupled to the surface of the platform. The apertures are positioned in the housing, and the top wall is substantially transparent. A first opening is in the housing. The first in opening is in the front wall. A second opening is also in the housing. The second opening located is in the back wall. A blower means circulates air. The blower means has an intake duct and an exit duct. The blower means is mounted to the top surface of the platform. The intake duct is in fluid communication with an interior of the housing. The exit duct extends into the platform and is in fluid communication with the lumen. A liquid medium is in the lumen,

6 Claims, 2 Drawing Sheets

APPARATUS FOR CONTROLLING AIR-BORNE PARTICLES AT A MANICURE WORK STATION

BACKGROUND OF THE INVENTION

1. Field of the Invention

The present invention relates to air purifiers and more particularly pertains to a new apparatus for controlling air-borne particles at a manicure work station for controlling fumes and air-borne particles associated with manicures.

2. Description of the Prior Art

The use of air purifiers is known in the prior art. More specifically, air purifiers heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,112,373; U.S. Pat. No 5,816,906; U.S. Pat. No. 5,787,903; U.S. Pat No. 4,852,468; U.S. Pat. NO. 5,395,166; and U.S. Des. Pat. No. 285,962.

While these devices fulfill their respective, particular objectives and requirements, the aforementioned patents do not disclose a new apparatus for controlling air-borne particles at a manicure work station. The inventive device includes a platform. The platform has a top surface. The platform has a lumen therein. The platform has a plurality of apertures extending into the lumen from the top surface. A housing has a top wall, a front wall, a back wall, a first side wall and a second side wall. The housing is integrally coupled to the surface of the platform. The apertures are positioned in the housing, and the top wall is substantially transparent. A first opening is in the housing. The first opening is in the front wall. A second opening is also in the housing. The second opening located is in the back wall. A blower means circulates air. The blower means has an intake duct and an exit duct. The blower means is mounted to the top surface of the platform. The intake duct is in fluid communication with an interior of the housing. The exit duct extends into the platform and is in fluid communication with the lumen. A liquid medium is in the lumen.

In these respects, the apparatus for controlling air-borne particles at a manicure work station according to the present invention substantially departs from the conventional concepts and designs of the prior art, and in so doing provides an apparatus primarily developed for the purpose of controlling fumes and air-borne particles associated with manicures.

SUMMARY OF THE INVENTION

In view of the foregoing disadvantages inherent in the known types of air purifiers now present in the prior art, the present invention provides a new apparatus for controlling air-borne particles at a manicure work station construction wherein the same can be utilized for controlling fumes and air-borne particles associated with manicures.

The general purpose of the present invention, which will be described subsequently in greater detail, is to provide a new apparatus for controlling air-borne particles at a manicure work station apparatus and method which has many of the advantages of the air purifiers mentioned heretofore and many novel features that result in a new apparatus for controlling air-borne particles at a manicure work station which is not anticipated, rendered obvious, suggested, or even implied by any of the prior art air purifiers, either alone or in any combination thereof.

To attain this, the present invention generally comprises a platform. The platform has a top surface. The platform has a lumen therein. The platform has a plurality of apertures extending into the lumen from the top surface. A housing has a top wall, a front wall, a back wall, a first side wall and a second side wall. The housing is integrally coupled to the surface of the platform. The apertures are positioned in the housing, and the top wall is substantially transparent. A first opening is in the housing. The first opening is in the front wall. A second opening is also in the housing. The second opening located is in the back wall. A blower means circulates air. The blower means has an intake duct and an exit duct. The blower means is mounted to the top surface of the platform. The intake duct is in fluid communication with an interior of the housing. The exit duct extends into the platform and is in fluid communication with the lumen. A liquid medium is in the lumen.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structure, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new apparatus for controlling air-borne particles at a manicure work station apparatus and method which has many of the advantages of the air purifiers mentioned heretofore and many novel features that result in a new apparatus for controlling air-borne particles at a manicure work station which is not anticipated, rendered obvious, suggested, or even implied by any of the prior art air purifiers, either alone or in any combination thereof.

It is another object of the present invention to provide a new apparatus for controlling air-borne particles at a manicure work station which may be easily and efficiently manufactured and marketed.

It is a further object of the present invention to provide a new apparatus for controlling air-borne particles at a manicure work station which is of durable and reliable construction.

An even further object of the present invention is to provide a new apparatus for controlling air-borne particles at a manicure work station which is susceptible of a low cost manufacture with regard to both materials and labor, and which accordingly is then susceptible of low prices of sale to the consuming public, thereby making such apparatus for controlling air-borne particles at a manicure work station economically available to the buying public.

Still yet another object of the present invention is to provide a new apparatus for controlling air-borne particles at a manicure work station which provides in the apparatuses and methods of the prior art some of the advantages thereof, while simultaneously overcoming some of the disadvantages normally associated therewith.

Still another object of the present invention is to provide a new apparatus for controlling air-borne particles at a manicure work station for controlling fumes and air-borne particles associated with manicures.

Yet another object of the present invention is to provide a new apparatus for controlling air-borne particles at a manicure work station which includes a platform. The platform has a top surface. The platform has a lumen therein. The platform has a plurality of apertures extending into the lumen from the top surface. A housing has a top wall, a front wall, a back wall, a first side wall and to a second side wall. The housing is integrally coupled to the surface of the platform. The apertures are positioned in the housing, and the top wall is substantially transparent. A first opening is in the housing. The first opening is in the front wall. A second opening is also in the housing. The second opening located is in the back wall. A blower means circulates air. The blower means has an intake duct and an exit duct. The blower means is mounted to the top surface of the platform. The intake duck is in fluid communication with an interior of the housing. The exit duct extends into the platform and is in fluid communication with the lumen. A liquid medium is in the lumen.

Still yet another object of the present invention is to provide a new apparatus for controlling air-borne particles at a manicure work station that may be easily transported between work stations.

Even still another object of the present invention is to provide a new apparatus for controlling air-borne particles at a manicure work station that uses water as a liquid medium to reduce the need for additional chemical reagents.

These together with other objects of the invention, along with the various features of novelty which characterize the invention, are pointed out with particularity in the claims annexed to and forming a part of this disclosure. For a better understanding of the invention, its operating advantages and the specific objects attained by its users, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
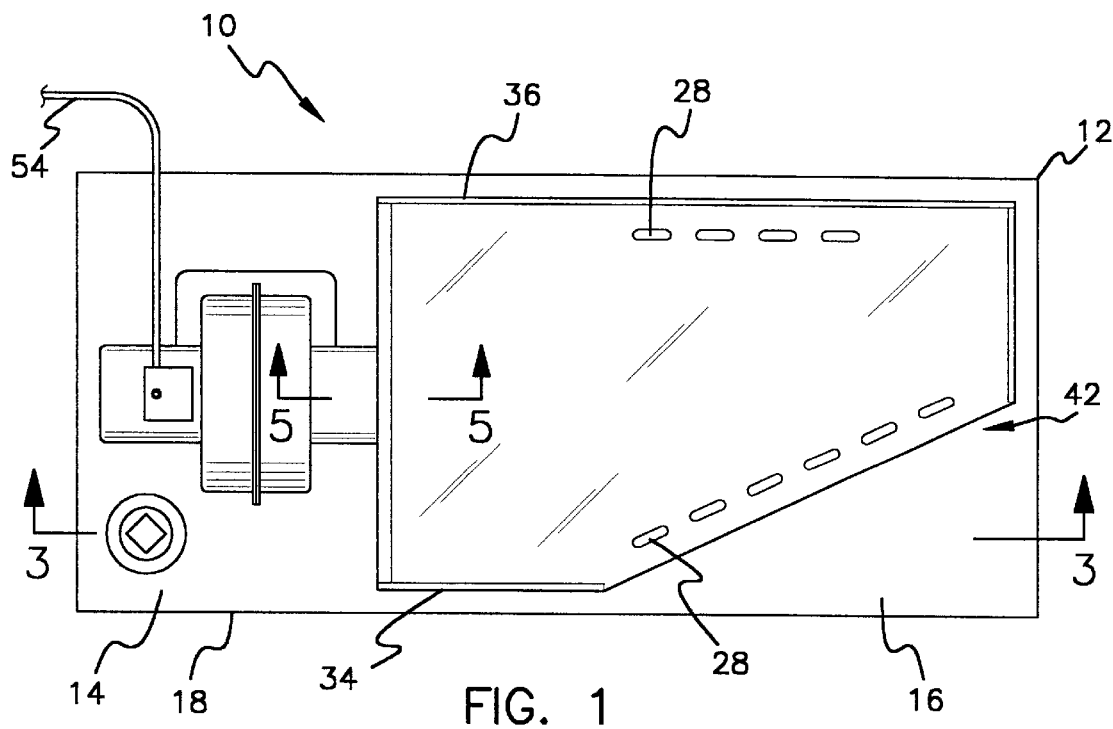
FIG. 1 is a schematic top view of a new apparatus for controlling air-borne particles at a manicure work station according to the present invention.
Figure 2:
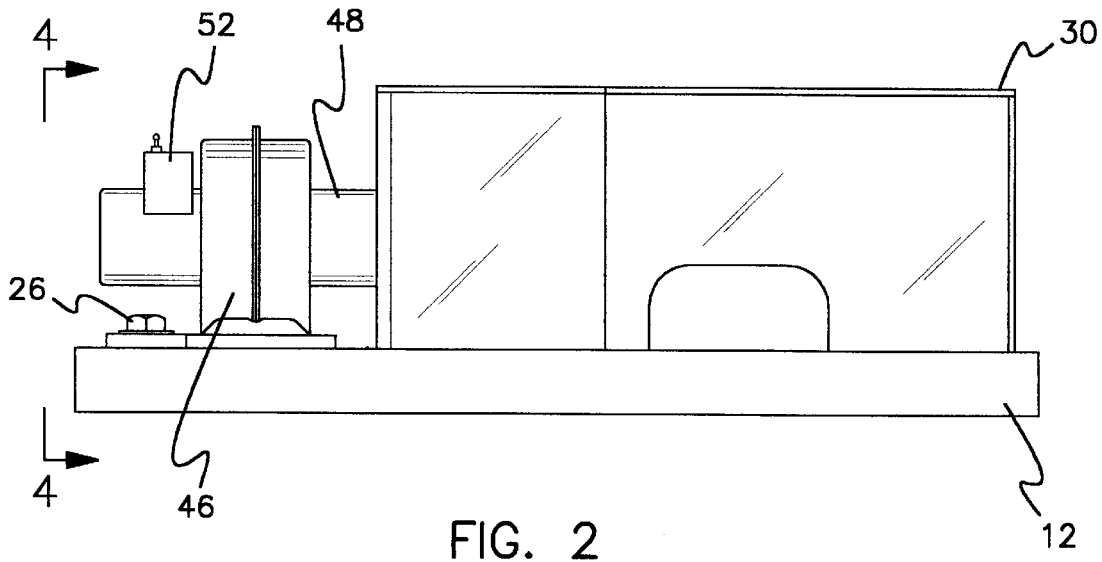
FIG. 2 is a schematic side view of the present invention.
Figure 3:
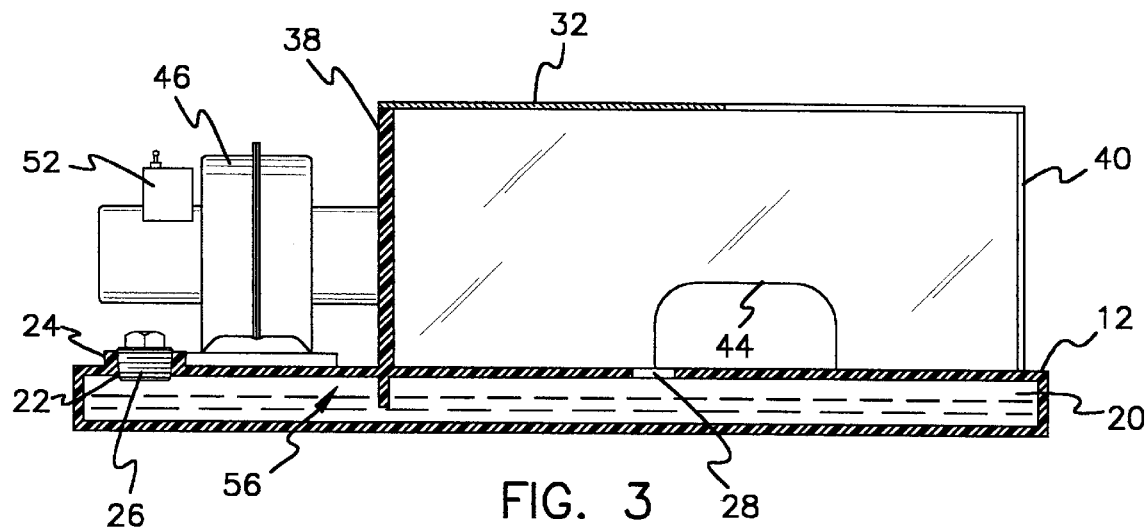
FIG. 3 is a schematic cross-sectional side view taken along line 3—3 of the present invention.
Figure 4:
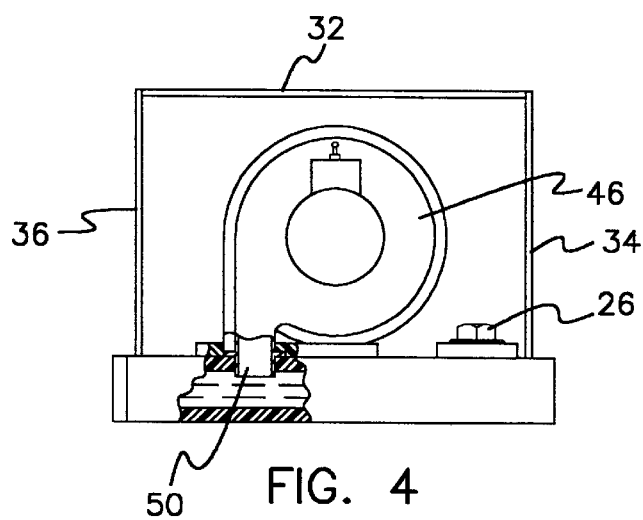
FIG. 4 is a schematic cross-sectional end view of the present invention.
Figure 5:
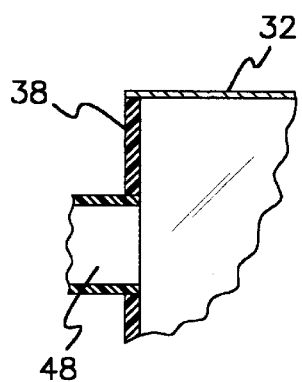
FIG. 5 is a schematic cross-sectional top view taken along line 5—5 of the present invention.

With reference now to the drawings, and in particular to FIGS. 1 through 5 thereof, a new apparatus for controlling air-borne particles at a manicure work station embodying the principles and concepts of the present invention and generally designated by the reference numeral 10 will be described.

As best illustrated in FIGS. 1 through 5, the apparatus for controlling air-borne particles at a manicure work station 10 generally comprises a platform 12 having a housing 30 thereon. The platform 12 has a top surface 14, a distal portion 18 and a proximal portion 16. The platform 14 is hollow and has a lumen 20 therein. The distal portion 18 has a hole 22 therein for filling or emptying the lumen. The hole 22 has a shoulder 24. A plug 26 is removably insertable in the hole 22. Ideally the hole is threaded and the plug 26 may be screwed in to the hole. The proximal portion 16 has a plurality of apertures 28 therein. The surface 14 of the platform has a generally rectangular shape.

The housing 30 has a top wall 32, a front wall 34, a back wall 36, a first side wall 38 and a second side wall 40. The housing 30 is integrally coupled to the surface 14 of the platform 12. The housing 30 is positioned generally in the proximal portion 16 of the platform 12 such that watch of the apertures 28 is located in the housing 30. Each of the walls is substantially transparent and each is preferably comprised of a plastic.

A first opening 42 in the housing extends between the platform 12 and the top wall 32. The first opening 42 extends into a juncture of the front wall 34 and the second side wall 40. The first opening extends in to the top wall 32 such that the top wall 32 has five edges. The first opening 42 extends into at least one-half of a length of the front wall 34. The first opening 42 needs to be large enough for the manicurist to place their hands inside.

A second opening 44 in the housing is located in the back wall 36. The second opening 44 is generally positioned adjacent to the platform 12. The second opening 44 has a height less than one-half of a height of the back wall 36, and a length less than one half of a length of the back wall. The second opening 44 is smaller to accommodate only the one hand of the person receiving the manicure. Ideally, the apertures form two rows of apertures. One of the rows is aligned with the first opening and the second row is aligned with the second opening. The rows of apertures 28 form an air curtain in front of the openings 42, 44 to prevent particulate from leaving the housing 30. A second embodiment, now shown, only contains the first opening 42 and not the second 44 opening. The second embodiment may be used as a standard hood.

A blower means 46 circulates the air. The blower means 46 has an intake duct 48 and an exit duct 50. The blower means 46 is mounted to the top surface 14 of the platform 12, and is generally located in the distal portion 18 of the platform 12. The intake duct 48 extends through the first side wall 38 of the housing 30, and the exit duct 50 extends through the top surface 14 of the platform 12 and is in fluid communication with the lumen 20. The blower means has an actuating means 52 operationally coupled thereto comprising a switch for turning the blower means on and off. A power supply 54 is coupled to the actuating means 52 for supplying power to the blower means. The power supply is operationally coupled to the actuating means.

A liquid medium 56 is in the lumen 20. Preferably, the liquid medium 56 comprises water.

A baffle 58 separates the distal portion 18 of the lumen 20 from the proximal portion 16 of the lumen such that an airflow between the distal and proximal portion must travel through the liquid medium 56. The baffle 58 has a height generally equal to one-half of a height of the lumen 20.

In use, the manicurist places the liquid medium in the lumen. The blower means is then turned on which pulls air from the housing and forces it into the lumen. While giving the manicure, the particles and vapors associated therewith are forced into the lumen and into the liquid medium. The air must travel under the baffle in order to leave through the apertures. The liquid medium traps particles and vapors which are common during a manicure.

As to a further discussion of the manner of usage and operation of the present invention, the same should be apparent from the above description. Accordingly, no further discussion relating to the manner of usage and operation will be provided.

With respect to the above description the, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desire to limit the invention to the exact construction and operation shown and described, and accordingly, all suitable modifications and equivalents may be resorted to, falling within the scope of the invention.

I claim:

1. An apparatus for controlling vapors and air-borne particles at a manicure work station, said apparatus comprising:
    a platform, said platform having a top surface, said platform having a lumen therein, said platform having a plurality of apertures therein;
    a housing, said housing having a top wall, a front wall, a back wall, a first side wall and a second side wall, said housing being integrally coupled to said surface of said platform, wherein said apertures are generally positioned in said housing, said top wall being substantially transparent;
    a first opening in said housing, said first opening being located in said front wall;
    a second opening in said housing, said second opening being located in said back wall;
    a blower means for circulating air, said blower means having an intake duct and an exit duct, said blower means being mounted to said top surface of said platform, said intake duct being in fluid communication with an interior of said housing, said exit duct being in fluid communication with said lumen;
    a liquid medium, said liquid medium being said lumen; and
    a baffle positioned between a distal portion of said lumen and a proximal portion of said lumen, said baffle extending downwardly from said top wall for extending below a top surface of said liquid medium for forcing an airflow between said distal and proximal portion through said liquid medium.

2. The apparatus for controlling vapors and air-borne particles at a manicure work station as in claim 1, wherein said platform further comprises:
    said platform having a distal portion and proximal portion, said distal portion having a hole therein, said hole having a shoulder, a plug being removably insertable in said hole, said proximal portion having said apertures therein.

3. The apparatus for controlling vapors and air-borne particles at a manicure work station as in claim 1, wherein said first opening a further comprises:
    said first opening extending between said platform and said top wall, said first opening extending into a juncture of said front wall and said second side wall, said first opening extending into said top wall such that said top wall has five edges, said first opening extending into at least one-half of a length of said front wall.

4. The apparatus for controlling vapors and air-borne particles at a manicure work station as in claim 3, wherein said second window further comprises:
    a second opening in said housing, said second opening being in said back wall, said second opening being generally adjacent to said platform, said second opening having a height less than one-half of a height of said back wall, said second opening having a length less than one half of a length of said back wall.

5. The apparatus for controlling vapors and air-borne particles at a manicure work station as in claim 3, further comprising:
    said baffle having a height generally equal to one-half of a height of said lumen.

6. An apparatus for controlling vapors and air-borne particles at a manicure work station, said apparatus comprising:
    a platform, said platform having a top surface, said platform having a distal portion and a proximal portion, said platform having a lumen therein, said distal portion having a hole therein, said hole having a shoulder, a plug being removably insertable in said hole, said proximal portion having a plurality of apertures therein, said surface of said platform having a generally rectangular shape;
    a housing, said housing having a top wall, a front wall, a back wall, a first side wall and a second side wall, said housing being integrally coupled to said surface of said platform, said housing being positioned generally in said proximal portion of said platform such that each of said apertures is located in said housing, each of said walls being substantially transparent;
    a first opening in said housing, said first opening extending between said platform and said top wall, said first opening extending into a juncture of said front wall and said second side wall, said first opening extending into said top wall such that said top wall has five edges, said first opening extending into at least one-half of a length of said front wall;
    a second opening in said housing, said second opening being in said back wall, said second opening being generally adjacent to said platform, said second opening having a height less than one-half of a height of said back wall, said second opening having a length less than one half of length of said back wall;

a blower means for circulating air, said blower means having an intake duct and an exit duct, said blower means being mounted to said top surface of said platform, said blower means being generally located in said distal portion of said platform, intake duct extending through said first side wall of said housing, said exit duct extending through said top surface of said platform and being in fluid communication with said lumen, said blower means having an actuating means operationally coupled thereto for turning said blower means on and off, said actuating means being operationally coupled to a power supply;

a liquid medium, said liquid medium being said lumen, said liquid medium comprising water; and a baffle positioned between a distal portion of said lumen and a proximal portion of said lumen, said baffle extending downwardly from said top wall for extending below a top surface of said liquid medium for forcing an airflow between said distal and proximal portions through said liquid medium, said baffle having a height generally equal to one-half of a height of said lumen.

* * * * *